FIG. I.

INVENTOR
BERTRAM C. KEMPSON
BY
Reynolds & Christensen
ATTORNEY

United States Patent Office 3,302,487
Patented Feb. 7, 1967

3,302,487
POWER TRANSMISSION
Bertram Carl Kempson, Cheltenham, England, assignor to Dowty Hydraulic Units Limited, Gloucester, England, a British company
Filed Sept. 20, 1963, Ser. No. 310,410
Claims priority, application Great Britain, Sept. 26, 1962, 36,593/62
5 Claims. (Cl. 74—733)

This invention relates to an infinitely variable transmission comprising an infinitely variable positive displacement hydraulic pump in hydraulic connection with a positive displacement motor which may be either of fixed or infinitely variable displacement, the pump being driven by an engine or other power source and the motor being connected to drive a load.

This invention has for its object to provide an infinitely variable speed ratio power transmission of the kind referred to in combination with a mechanical step-change gearbox to increase the effective range of speed ratio through the transmission over which efficient power transmission may take place. A further object is to provide a control system for such a combined transmission and gearbox which renders manual gear selection in the gearbox unnecessary.

The present invention comprises an infinitely variable speed ratio power transmission of the kind referred to and a mechanical step-change gearbox connected together for the transmission of power from an engine or other power source successively through the transmission in the gearbox to a load, and includes means responsive to the transmission pump speed to control transmission speed ratio in the sense to tend to keep pump speed at a predetermined value, and gear changing means responsive to increase in transmission speed ratio to a high value to cause selection of mechanical gear having a high speed ratio and responsive to reduction of transmission speed ratio to a low value to select a mechanical gear having a low speed ratio. Any kind of mechanical step-change gearbox may be employed although preference is given to gearboxes of the kind particularly constructed to facilitate easy gear changing and employing a servo motor for gear changing.

A speed governor may be provided for the engine or other power source operable to control engine or power source speed by the control of fuel flow thereto, means being provided to ensure that the speed ratio of the transmission and of the gearbox are maintained at the maximum when the speed governor controls engine or power source speed.

The means responsive to transmission pump speed may comprise a fixed displacement pump driven in fixed speed relation to the transmission pump, a restrictor through which the delivery from the fixed displacement pump is arranged to pass and pressure drop means responsive to reduction of the pressure drop at the restrictor below a predetermined value to initiate reduction of transmission speed ratio below its maximum value.

One embodiment of the invention for use on a vehicle for the transmission of power from the engine to the ground engaging wheels will now be described with reference to the accompanying drawings in which.

Figure 1:
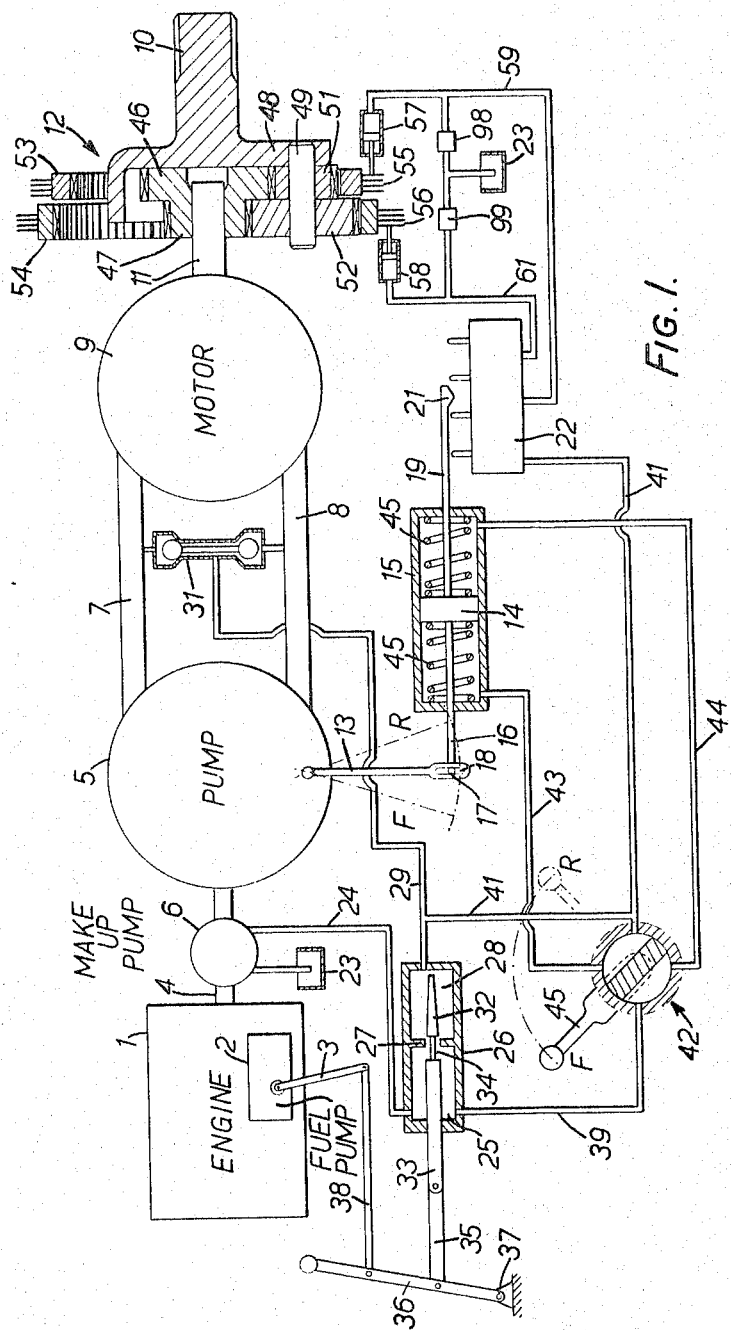
FIGURE 1 is a diagrammatic illustration of the complete transmission.

Initially reference is made to FIGURE 1 of the drawings. In the drawings the vehicle engine is a diesel engine 1, power being transmitted by the transmission to a drive shaft 10 which is in direct connection with the ground engaging wheels of the vehicle. The engine 1 includes a fuel pump 2 of the conventional type incorporating a speed governor responsive to engine speed, fuel being fed to the engine to tend to maintain the speed selected by the governor. The governor setting is adjusted by a pivoted lever 3 extending from the pump unit 2. The output shaft 4 of the engine 1 directly drives a main transmission pump 5 of the infinitely variable positive displacement type and a small fixed displacement pump 6 of the gear type. Hydraulic pipes 7 and 8 extend from the pump 5 to a fixed positive displacement hydraulic motor 9. The output shaft 11 of the motor forms the input shaft of an epicyclic gearbox 12 whose output shaft 10 is connected to drive the vehicle wheels.

The displacement of the pump 5 is controlled by a lever 13 extending from the pump. In the position of the lever shown, zero displacement is selected. Movement of the lever 13 to the left as seen in the drawings will give a forward displacement to the pump 5 whilst movement to the right will give a reverse displacement. For adjustment of the lever 13 a piston 14 is provided slidably mounted within a fixed cylinder 15. From one end of the piston 14 a connecting rod 16 extends in sealed manner through one end of cylinder 15 to a pin 17 engaging in a slot 18 of the lever 13. From the opposite side of the piston 14 a connecting rod 19 extends in sealed manner through the other end of the cylinder 15 and at its remote end carries a cam lobe 21 for co-operation with a pilot valve assembly 22.

The gear pump 6 draws hydraulic liquid from a reservoir 23 and delivers it at low pressure to a pipe 24. Liquid from the pipe 24 enters a chamber 25 of a variable restrictor unit 26. Liquid within the unit 26 passes from chamber 25 through an orifice 27 to a chamber 28. From the chamber 28 liquid flow leaves through a pipe 29 to enter a shuttle valve 31 connected to the hydraulic pipes 7 and 8. The function of the shuttle valve 31 is to connect the pipe 29 to which ever of the pipes 7 and 8 is at the lower pressure. Within the restrictor unit 26 a tapered needle 32 is mounted for axial sliding movement through the orifice 27. The needle 32 is carried by a rod 33 slidable through a convenient seal in the wall of the chamber 25. At a position where the needle 32 is secured to the rod 33 a groove 34 is provided around the needle. A link 35 pivotally interconnects the rod 33 with a speed control lever 36. The lever 36 is secured by a pivot 37 to a fixed part of the vehicle and is adjustable by the vehicle driver to select the engine operating speed. The position of the lever 36 as shown in the drawing corresponds to idling engine speed. In this position it is arranged that the groove 34 of needle 32 should be located in the orifice 27. For any higher engine speed the tapered portion of needle 32 will be moved into the orifice by lever 36.

A further pivoted link 38 inter-connects the lever 36 with a governor setting lever 3 of the fuel pump 2. Each position of lever 36 corresponds to a different selected engine speed. A selected engine speed is defined as the governed speed of the engine at which fuel injection per revolution of the engine has been increased by the governor to a maximum following torque demand made on the engine. For any given position of lever 36 the engine speed will exceed the selected speed for small torque demands from the engine in the conventional manner.

The pressures on either side of the orifice 27 are fed through pipes 39 and 41 to a reversing valve 42. From the reversing valve pipes 43 and 44 extend to either end of the servo cylinder 15. The reversing valve is a two-position valve controlled by a lever 45 which, in the position shown, is intended to give forward propulsion of the vehicle. In this position the pipe 39 is connected to pipe 44 to supply the upstream pressure from the orifice 27 to the right-hand end of cylinder 15. Pipe 41 carrying downstream pressure from the orifice 27 is connected to pipe 43 which enters the left-hand end of cylinder 15 as seen in the drawing. The pressure drop occurring at the orifice 27 for the forward position of the valve 42 will, therefore, tend to urge the piston 14 to the left, as seen in the drawing. Within the cylinder 15 a pair of caged springs 45 are provided which act on the piston 14 to ensure that before the piston 14 can move from the central position a predetermined pressure difference must exist between the ends of the cylinder. When the groove 34 occupies the orifice 27 it is arranged that the pressure drop produced, because of the large effective size of the orifice 27, is then so small as to be incapable of moving the piston 14 from its central position.

The gearbox 12 includes two coaxial sun gears 46 and 47 secured to the output shaft 11 of the motor. The gear 47 is of smaller diameter than the gear 46. A planet carrier 48 drives the output shaft 10 and is coaxial with the drive shaft 11. A short shaft 49, fixed to the planet carrier, carries a pair of planet pinions 51 and 52 which mesh respectively with sun gears 46 and 47. The planet pinions are loose on the shaft 49. A pair of cage gears 53 and 54 are rotatably mounted co-axially with the shafts 11 and 10 and engage the planet pinions 51 and 52 respectively. The cage gears 53 and 54 include at their peripheries brakes 55 and 56 respectively which can be locked against rotation by piston and cylinder units 57 and 58 respectively.

The pilot valve assembly 22 feeds liquid at pressure to one or the other of the pair of pipes 59 and 61 connected respectively to the units 57 and 58. The assembly 22 receives liquid at pressure for this purpose from the pipe 41.

Figure 2:
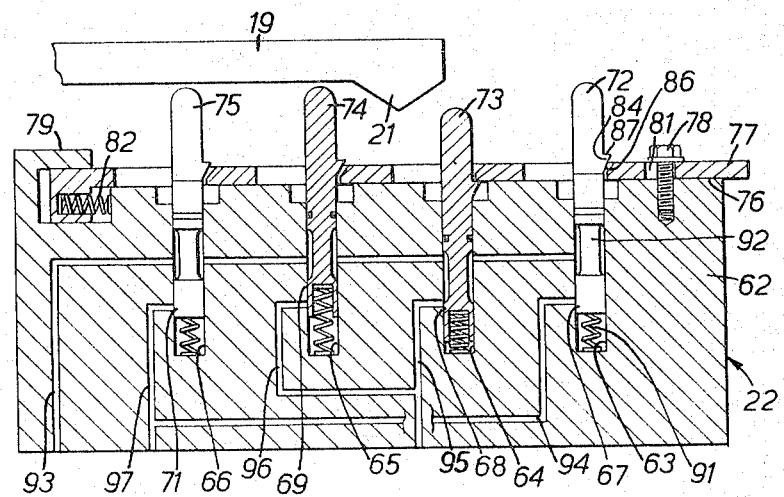
FIGURES 2, 3 and 4 are views illustrating the pilot valve assembly for engaging gears in the mechanical gearbox, and, FIGURES 5 and 6 are views of a modified form of part of the pilot valve assembly.
Figure 3:
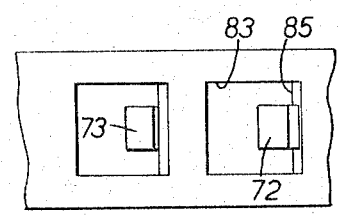
Figures 4, 6:
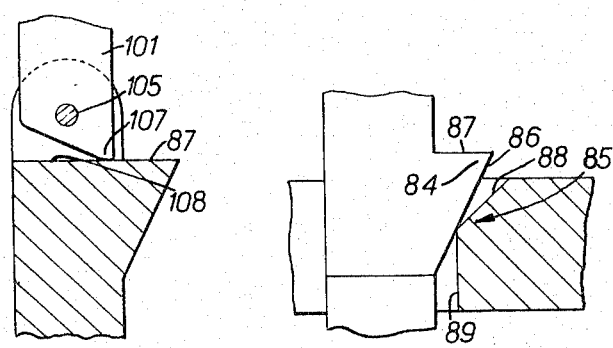

To explain the construction of the pilot valve assembly 22 reference is now made to FIGURES 2, 3 and 4 of the accompanying drawings. FIGURE 2 shows the assembly in cross section. It comprises a body member 62 having four spaced parallel bores 63, 64, 65 and 66 within which pilot valve members 67, 68, 69 and 71 respectively are slidably mounted. Each valve member includes respectively an operating member 72, 73, 74 and 75 extending from a flat surface 76 of the body 62. These operating members are arranged in line for traversal by the cam lobe at 21 of piston 14. Over the flat surface 76 of the body 62 a retaining plate 77 is slidably mounted by means of bolt 78 and a retaining lug 79. Plate 77 has a small amount of permitted sliding movement by virtue of the slot 81 through which bolt 78 engages in the body 72. Such sliding movement is against the loading of a compression spring 82 which operates to urge the plate 77 to the left as seen in the drawing. The function of the retaining plate 77 is to retain depressed any of the valve members 67 to 71 after depression by the cam lobe 21 and on depression of any valve member to release any other valve member previously retained depressed. To explain this function it is necessary only to refer to the particular structure for one valve member, the structure for the others being similar. Reference is therefore made to the valve member 67. The operating member 72 of the valve 67 extends through a hole 83 in the plate 77 and a tooth 84 projecting from the side of the member 72 is arranged to engage one edge 85 of the hole 83. Tooth 84 includes a surface 86 inclined to the axis of cylinder 63 and a retaining surface 87 perpendicular to the axis of cylinder 63. The edge 85 includes an inclined portion 88 and a portion 89 parallel to the axis of cylinder 63. Depression of the operating member 72 will cause the inclined surface 86 to engage the junction of surfaces 88 and 89 of plate 77 to urge the latter to the right as shown in the drawing against the loading of spring 82. The edge of the tooth 84 formed by the junction of the surfaces 86 and 87 when it engages surface 89 will have moved plate 77 a maximum distance to the left to the extent that any of the other three valve members 64, 65 or 66 retained in the depressed condition will have been released. Further depressing movement of the member 72 will carry the edge of the tooth 84 along the surface 89 until the underside of the plate 77 is moved by spring force over the surface 87 of tooth 84 to retain the valve member 67 in the depressed condition. Each of the bores 63 to 66 includes a spring 91 acting on the enclosed piston valve to urge it outwardly.

Each of the valve members 66 to 71 includes a waisted portion 92. A passage 93 in the body 62 interconnects all bores 63 to 66 at positions to communicate with the waisted portions 92. These waisted portions 92 are of such length that they communicate with the passage 93 in the depressed and raised condition of the valve members. From each of the bores 63 to 66 a feed port respectively 94, 95, 96 and 97 extends. Ports 94 and 97 are connected together to the pipe 59 extending from the assembly 22. Ports 95 and 96 are also connected together to the pipe 61 extending from the assembly 22. Each of the ports 94 to 97 is so positioned in its associated cylinder that it connects into the waisted portion 92 of the associated piston valve only after the edge of the tooth 84 has moved over approximately one half of the surface 89 of the retaining plate 77. This ensures that at any one time no more than one of the ports 94 to 97 can effectively be connected to the passage 93. This will prevent simultaneous engagement of the clutches 55 and 56 which could cause damage to the transmission by locking it against rotation.

In the central position of the servo piston 14 corresponding to zero displacement of the transmission pump 5 the cam lobe 21 is arranged to be centrally located between the operating members 74 and 73. Depression of either of valve members 68 or 69 will connect pressure into the pipe 61 to engage brake 56 and so to cause power to be transmitted to the shaft 10 from the shaft 11 through the gears 47 and 52 which form the lowest mechanical gear ratio between the shafts 11 and 10. Depression of either of the piston valve members 67 or 71 will supply pressure to unit 57 to engage brake 55. Power will then be transmitted through gears 46 and 51 in its passage from shaft 11 to shaft 10 at a high mechanical gear ratio. A pair of restrictors 98 and 99 extend from the pipes 59 and 61 to the hydraulic reservoir 23. The function of these restrictors is to prevent hydraulic pressure being retained in either of the units 57 or 58 after the connection to the hydraulic pressure supply pipe 21 is cut off within the assembly 22 by the valves 67, 68, 69 and 71.

In operation of a vehicle having the described transmission the engine may be started with lever 36 in the idling position. In this position, groove 34 occupies the orifice 27 so that liquid delivered by the main makeup pump will not generate any substantial pressure drop at the orifice 27 to cause displacement of the piston 14 from the neutral position. Stopping of the engine after its previous operation will have moved the lobe 21 to the central position depressing one or the other of the operating members 73 or 74. Servo liquid delivered by pump 6 will therefore engage brake 56 when the engine is started. Before moving off the driver will select lever 45 to give the appropriate forward or reverse direction. In the present example it is assumed that lever 45 is in the forward direction. The driver will then move lever 36 to increase engine speed. At all selected speeds above the minimum power producing speed of the engine the tapered larger diameter portion of the needle 36 will be in the orifice 27 and the pressure drop occurring at the orifice due to flow through it of the delivery of the pump 6 will be sufficient to move piston 14 to the left, as seen in the drawing, to give forward pump displacement. Thus by moving lever 36 to increase selected engine speed, power may be transmitted smoothly through the transmission and the low mechanical gear causing the vehicle to move off smoothly. Assuming that the lever 36 is held in a fixed position the vehicle will then accelerate. Engine speed will also rise although only to a slight extent and at the selected speed for the position of lever 36 the pressure drop at the orifice 27 will rise through values corresponding to intermediate hydraulic transmission output speeds to a value sufficient to give full movement of piston 14 against spring 45 thus raising the pump 5 to maximum displacement and the transmission to maximum speed ratio. At this position the lobe 21 will depress operating member 75 to engage brake 55 and to release brake 56 thus selecting the higher mechanical speed ratio. Because of the higher speed ratio the inertia and resistance to motion of the vehicle will require a greater torque load from motor 9 which in turn will require the engine to exert a greater torque load on pump 5. The speed of the engine and pump 5 will then drop slightly to reduce the pressure drop at orifice 27 whereby spring 45 will move piston 14 to reduce the displacement of pump 5. The vehicle will then accelerate assuming the resistance to motion is small and engine speed will rise slightly until the selected speed is attained at which the displacement of pump 5 will have been advanced to the maximum. Further vehicle acceleration will then give increase in engine speed in proportion to increase in vehicle speed. Increase of engine speed above the selected speed will result in the fuel pump governor 2 reducing fuel flow per revolution of the engine. If vehicle speed further increases, for example when the vehicle is on a down grade, fuel supply will be reduced by the pump governor to a minimum and the engine will act as a brake on the vehicle.

If the vehicle, when high mechanical gear is selected, moves on to an up grade, increased torque is required of the engine which will reduce engine speed. Reduction of engine speed down to the selected speed will increase fuel flow per revolution from the governor pump 2 to a maximum. When speed drops below the selected speed the reduction of pressure drop at the orifice 27 will permit springs 45 to reduce displacement of pump 5 into the intermediate range of hydraulic transmission output speeds. Reduction of pump displacement enables the motor 9 to exert a greater torque to drive the vehicle along the up grade. If the grade is sufficiently steep reduction of pump displacement will be such that lobe 21 will depress operating member 74 to engage brake 56 and release brake 55 and thus engage mechanical low gear. The torque demanded by the pump from the engine may thus decrease, allowing engine speed and pump displacement to increase so that lobe 21 moves into the positions corresponding to intermediate hydraulic transmission output speeds from member 74 towards member 75. However, member 74 remains depressed. Further increase in the grade would result in reduction of engine speed and reduction of pump displacement. As the pump approaches zero displacement the overall speed ratio between engine and output shaft 10 becomes very low giving an extremely large driving torque at low speed at the output shaft 10.

The tapering of needle 32 is such that for any position of lever 36 the corresponding selected speed of the engine is such that pressure drop at the orifice is just sufficient to move piston 14 fully against the springs 45 to give maximum displacement of pump 5.

Substantially the same automatic control of the engagement of the mechanical gear and of the selection of the displacement of the transmission pump takes place when the reverse propulsion is selected by the moving lever 45. In this instance however the lobe 21 will operate on the pilot valves 67 and 68.

Figure 5:
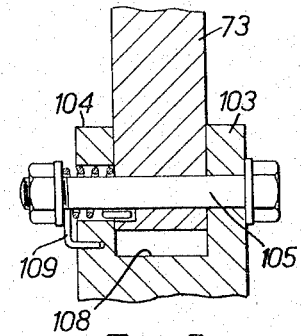

The described embodiment of FIGURES 1 to 4 relates to an arrangement incorporating a two speed mechanical gearbox. It is within the scope of the present invention for the mechanical gearbox to have any number of mechanical speed ratios each of which is selectable by a pilot valve or equivalent member. Where there are more than two mechanical speed ratios it is preferable that one at least of the intermediate speed ratios should not be selected when the load, e.g. the vehicle, is being accelerated. For this purpose a pilot valve assembly, similar to that of FIGURE 2 except that it includes a larger number of pilot valves, could be used, one or more of the pilot valves corresponding to an intermediate mechanical speed ratio then being arranged as shown in FIGURES 5 and 6.

The operating member 101 of such a pilot valve is pivotally mounted as shown in these figures. The upper end of the pilot valve member at the level of the surface 87 is formed by a pair of spaced lugs 103 and 104. Between these lugs operating member 101 is pivotally mounted by means of a bolt 105 which extends through convenient holes in the lugs and in the operating member. The portion of the operating member 101 between the lugs is provided with an abutment 107 which engages against the surface 108 of the valve member between the lugs on rotation of the operating member 73 in one direction (clockwise in the drawing). This ararngement is selected to ensure that movement of the cam lobe 21 in the pump displacement increasing direction will move member 101 in an anti-clockwise sense as seen in FIGURE 6 against a torsion spring 109 rather than depress the associated piston valve. Movement of the lobe 21 in a pump displacement reducing direction will on engagement with the operating member 101 depress the valve member since engagement of the abutment 107 against surface 108 will prevent rotation of the operating member 101 in the clockwise sense. Where provision is made for forward and reverse power transmission a pair of pilot valves as illustrated in FIGURES 5 and 6 may be provided at the intermediate positions corresponding to forward and reverse power transmission the directions of permitted pivotal movement of the operating members being opposite to ensure non-operation of the associated pilot valves when transmission pump displacement is increasing in either the forward or reverse sense.

The arrangement described with reference to FIGURES 5 and 6 ensures omission of intermediate mechanical speed ratios during acceleration but ensures engagement of the intermediate gears during deceleration.

In this described embodiment the engine is governed by an engine governor operating through the fuel pump 2, it being arranged that when engine speed is reduced below the selected speed, control of engine speed is transferred to a transmission governor which comprises the variable orifice device 26 and the piston and cylinder unit 14 and 15. This arrangement is disclosed in my prior patent application Serial No. 279,849 now Patent No. 3,167,907. However, within the broad scope of the present invention it is not necessary for the engine or other power source to include a governor operating on fuel flow.

I claim as my invention:

1. In combination with a power source, a positive displacement hydraulic pump driven by the power source, and a positive displacement hydraulic motor hydraulically connected to the pump to form a hydraulic power transmission, a step-change mechanical gear box driven by the motor and having at least two mechanical gear ratios, a hydraulic transmission speed control means which is adjustable to vary the output speed of the hydraulic transmission, and responsive to a change in the pump speed to vary the output speed of the hydraulic transmission in the sense of maintaining the pump speed constant, and gear change means operative to select one gear ratio at a time, and responsive to adjustment of the hydraulic transmission speed control means to a setting corresponding to a relatively low hydraulic transmission speed, to select the lower fixed gear ratio, and to adjustment of the transmission speed control means to a setting corresponding to a relatively high hydraulic transmission output speed to select the higher fixed gear ratio, said gear change means including a depressible actuator member for each gear ratio, of which that corresponding to the lower gear ratio is operative to engage the lower gear ratio and disengage the higher ratio when depressed, and that corresponding to the higher ratio is operative to engage the higher gear ratio and disengage the lower gear ratio when depressed, and a cam member which is operative to depress the first described actuator member when the hydraulic transmission speed control means is adjusted to its relatively low speed setting, and to depress the second described actuator member when the hydraulic transmission speed control means is adjusted to its relatively high speed setting.

2. In combination with a positive displacement hydraulic pump, a positive displacement hydraulic motor, and hydraulic means interconnecting the pump and the motor to form a hydraulic power transmission, a step-change mechanical gear box driven by the motor having at least two mechanical gear ratios, a hydraulic transmission speed control means which is adjustable to vary the output speed of the hydraulic transmission, and which has a pair of settings corresponding to relatively low and high hydraulic transmission output speeds, and a third setting therebetween corresponding to an intermediate hydraulic transmission output speed, means responsive to a change in the pump speed to cause the hydraulic transmission output speed control means to vary the hydraulic transmission output speed in the sense of maintaining the pump speed constant, gear change means responsive to adjustment of the hydraulic transmission speed control means from its intermediate speed setting to its low speed setting, to engage the lower gear ratio, and to adjustment of the hydraulic transmission speed control means from its intermediate speed setting to its high speed setting, to engage the higher gear ratio, and means operative to ensure that only one gear ratio is engaged at a time.

3. The combination according to claim 2 wherein the gear change means includes a depressible actuator member for each gear ratio, of which that corresponding to the lower gear ratio is operative to engage the lower gear ratio and disengage the higher ratio when depressed, and that corresponding to the higher gear ratio is operative to engage the higher gear ratio and disengage the lower gear ratio when depressed, and the hydraulic transmission speed control means has a cam member connected therewith which is operative to depress the first described actuator member when the hydraulic transmission speed control means is adjusted to its low speed setting, and to depress the second described actuator member when the hydraulic transmission speed control means is adjusted to its high speed setting.

4. The combination according to claim 1, wherein the power source includes a fuel powered engine having a speed governor connected therewith to control its speed by controlling the fuel flow thereto, and wherein there are additional control means connected to the speed governor to maintain the hydraulic transmission speed control means and gear ratio at the maximum when the governor reduces fuel flow to the engine below the maximum.

5. The combination according to claim 4, wherein the hydraulic transmission speed control means includes a fixed displacement hydraulic pump which is driven in fixed relation to the first named hydraulic pump, and has a restrictor in the delivery therefrom, and wherein the additional control means are responsive to a reduction in the pressure drop at the restrictor below a predetermined value to reduce the hydraulic transmission speed control means below the maximum.

References Cited by the Examiner

UNITED STATES PATENTS 2,893,269 7/1959 Morey et al. _____ 74—785
3,212,358 9/1965 De Lalio _____ 74—687

DAVID J. WILLIAMOWSKY, *Primary Examiner.*

J. R. BENEFIEL, *Assistant Examiner.*